(12) United States Patent
Roeder

(10) Patent No.: US 10,335,723 B2
(45) Date of Patent: Jul. 2, 2019

(54) FILTER DEVICE

(71) Applicant: HYDAC FILTERTECHNIK GMBH, Sulzbach/Saar (DE)

(72) Inventor: Dirk Roeder, Saarbruecken (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 36 days.

(21) Appl. No.: 15/610,765

(22) Filed: Jun. 1, 2017

(65) Prior Publication Data
US 2017/0348623 A1    Dec. 7, 2017

(30) Foreign Application Priority Data

Jun. 2, 2016  (DE) .......................... 10 2016 006 833

(51) Int. Cl.
| | | |
|---|---|---|
| *B01D 35/30* | (2006.01) | |
| *B01D 35/027* | (2006.01) | |
| *B01D 29/11* | (2006.01) | |

(52) U.S. Cl.
CPC .......... *B01D 35/306* (2013.01); *B01D 29/114* (2013.01); *B01D 35/027* (2013.01); *B01D 35/30* (2013.01); *B01D 2201/291* (2013.01); *B01D 2201/304* (2013.01); *B01D 2201/347* (2013.01); *B01D 2201/4046* (2013.01)

(58) Field of Classification Search
CPC .... B01D 35/306; B01D 35/027; B01D 35/30; B01D 29/114; B01D 2201/347; B01D 2201/4046; B01D 2201/291; B01D 2201/304
USPC .............................. 210/435, 450, 493.2, 437
See application file for complete search history.

(56) References Cited

U.S. PATENT DOCUMENTS

2002/0100720 A1 * 8/2002 Jainek .................. B01D 35/153
                                                                  210/248

FOREIGN PATENT DOCUMENTS

| DE | 100 64 482 | 7/2002 |
|---|---|---|
| EP | 2 405 987 | 6/2014 |

* cited by examiner

*Primary Examiner* — Madeline Gonzalez
(74) *Attorney, Agent, or Firm* — Wenderoth, Lind & Ponack, L.L.P.

(57) ABSTRACT

A filter device has a filter element (17) that is exchangeably disposed in a filter housing (1). The filter element (17) is provided on one end with an end cap (23) that forms a surround for a rim of a filter material (31). The end cap (23) has a connector (43) attaching the filter element (17) in an operating position to an element seat (19; 45) inside the filter housing (1) such that a fluid-impermeable connection is formed between filter housing (1) and filter element (17). The connector (43) enables the positionally fixed mounting of the filter element (17) and the formation of a fluid-impermeable connection in conjunction with element seats (19; 45) of filter housings (1) of different designs.

14 Claims, 14 Drawing Sheets

FILTER DEVICE

FIELD OF THE INVENTION

The invention concerns a filter device comprising at least one filter element that is exchangeably disposed in a filter housing. The filter element is provided on at least one end with an end cap that forms a surround for a filter material rim. The end cap is provided with a connector with which the filter element may be attached in an operating position to an element seat inside the filter housing in such a way that a fluid-impermeable connection is formed between filter housing and filter element. Moreover, the invention relates in particular to a filter element for use in such a filter device.

BACKGROUND OF THE INVENTION

Filter devices of this kind, but in different configurations, are prior art. Such filter devices are used in large volumes for the filtration of operating fluids such as hydraulic fluids, fuels, lubricants and similar fluids. One example of such a filter device is described, for example, in EP 2 405 987 B1. As in many other fields of engineering, the striving for improvements such as performance increase and cost-effective manufacture has also in filter devices led to the development of improved filter housings and filter elements. This striving has led to the situation where a large number of standard filter elements as well as filter elements of an advanced stage of development are on the market Also, a large number of plants operate with filter housings of an older development stage besides plants with filter housings of an advanced development stage. This situation causes operational problems for the user of filter devices. Filter housings of a later design are not fitted with standard filter elements, or filter elements of a later development stage are not inserted into filter housings of an older design.

SUMMARY OF THE INVENTION

In view of this situation, an object of the invention to provide an improved filter device of the type described at the outset in which the danger of malfunction through incorrect filter replacement in the housing is avoided.

This object is basically met, according to the invention, by a filter device having, as a significant feature of the invention, a connector enabling the positionally fixed mounting of the filter element and the formation of the fluid-impermeable connection in conjunction with element seats of filter housings of different designs. This way it is possible to freely exchange the new filter elements according to the invention not only in the newly developed filter housings, but also in earlier housing designs that are already on the market. In contrast, however, the current standard filter elements that are already available on the market no longer fit into the new housing, but only into the older standard housings (reverse-compatibility). Thus, already existing standard filter housings can now not only be safely operated with the common standard filter elements but also with the filter elements, according to the invention.

A particularly advantageous arrangement would be where the connector is provided with a connection adapter that protrudes coaxially to the longitudinal axis of the filter element. In a first design, on the inside of the connection adapter, a first sealing ring is provided to establish a seal on the outside of a pipe socket that engages in operating position with the element seat of a housing. On the outside of the connection adapter a second sealing ring is provided, which sealing ring forms the seal on the inside of a pipe socket that engages in operating position with the element seat of the housing in a further design.

In particularly advantageous embodiments, the connector is provided with an inner sleeve body that extends concentric to the longitudinal axis, where the inner sleeve forms the inner wall of the connection adapter, as well as an outer ring body that surrounds the inner sleeve body. The inner end of the ring body joins onto the part of the end cap that forms the surround of the filter element and that forms the outside of the connection adapter. Such a two-part design of the end cap is advantageous with regard to production from moulded plastic, since both parts can be made in a shape that favours the final moulding process.

A particularly advantageous arrangement may be that a recess is provided at the outer end section of the inner sleeve body that accommodates the first sealing ring, and that the inner end of the sleeve body protrudes into the inner hollow filter space of the filter element and forming a contact surface for a supporting tube of the filter element.

In particularly advantageous embodiments, the outside of the outer ring body of the connector is provided with a pattern of design irregularities deviating from a circular cylinder, which pattern is matched by a complementary pattern of design irregularities deviating from a circular cylinder on the inside of the pipe socket of the element seat of the housing of the further design. When aligned to each other, the design irregularities facilitate the placement of the filter element into the operating position in the housing of the further design. In filter housings with a design that is different from the standard housings, that is, in the further-developed design, the advantage arises that it is precluded that a filter element is used for a respective application that does not have the corresponding pressure rating or one that has unsuitable filter fineness. Moreover, the danger that a low-cost element from the market is used that does not meet the applicable safety standards is also averted. Since, in order to enable the reciprocal engagement, a positional reference is required in which the design irregularities have a positional reference to each other. The additional advantage arises where the engagement between element seat and end cap forms an anti-twist device so that the filter element is also braced against a possible torque moment around the longitudinal axis in the instance of tangential flow occurring inside the filter housing.

In advantageous embodiments the filter housing is provided in form of a pot. The filter element may be inserted from the top of the pot, and the filter element may be fastened to the element seat that forms a bottom part of the housing. In filter housings of this design, the housing cover usually serves as the upper closing of the housing as well as a support for the upper end cap of the filter element. Accordingly, the housing cover may only be screwed to the upper end of the filter housing or attached thereto if the filter element is correctly engaged with the element seat at the bottom of the housing. An attempt to inadvertently install a "wrong filter element" is immediately made apparent to the user.

Advantageously, the pattern of design irregularities on the outside of the ring body of the end cap may be formed by recesses that are open in inserting direction. Into those recesses, rib-shaped protrusions extend radially inwards in the operating position and engage with the inner wall of the pipe socket of the element seat of the housing of the further design.

Concerning the design of the element seat of the housing of the further design, the arrangement may advantageously be such that the pipe socket of the element seat of the housing forms, in the entry section that faces the filter element, on its inner wall a sealing surface that is free of protrusions to provide a contact surface for the second sealing ring of the end cap.

In this instance the outer ring body of the connection adapter may, with its rim that faces away from the filter material, overlap the assigned end of the inner sleeve body in such a way that the recess, which is formed at this end of the sleeve body for the first sealing ring, is closed to form an annular groove that retains the first sealing ring and that forms a seat for the sealing ring, in which the sealing ring is also retained if, in the instance of installation in a filter housing of the further design, only the second sealing ring is in contact with its assigned contact surface, but the first sealing ring is exposed.

In this instance, the recesses on the ring body that are part of the pattern of design irregularities may extend from the rim into the vicinity of an annular groove that retains the second sealing ring, which is located in the vicinity of the part of the ring body that forms the surround of the filter element.

The object of the invention is, furthermore, a filter element that is provided in particular for use in a filter device according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
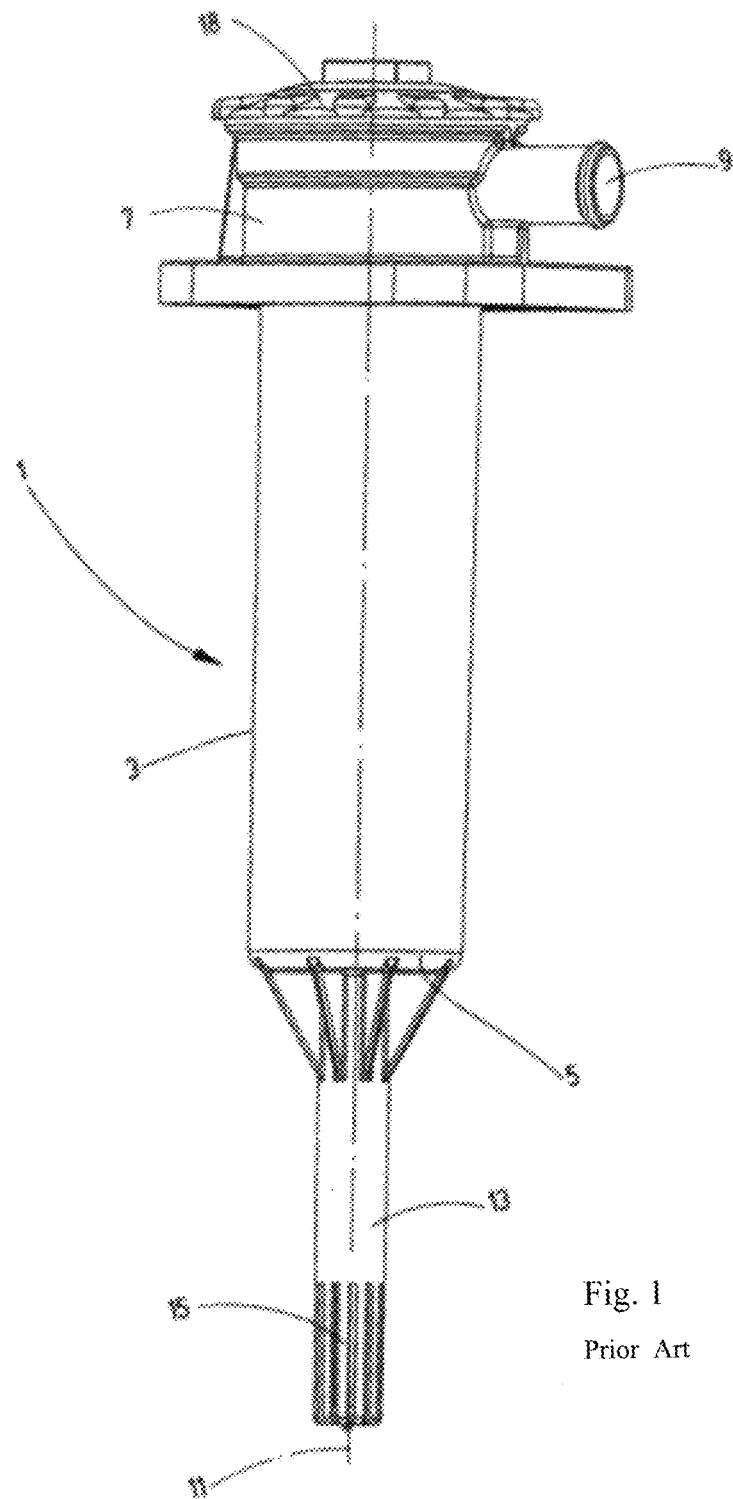
FIG. 1 is a perspective view of a prior art filter device.

With reference to the attached drawings, the invention will now be described by way of the example of a filter device in form of a return suction filter, which may be installed as an in-tank filter into a fluid storage tank (not shown). The filter housing 1 comprises a hollow, cylinder-shaped main part 3, which is closed at its bottom end by the housing bottom 5. Attached to the upper end of the main part 3 is a housing top 7. The housing top 7 comprises fluid passages that are commonly provided in filter housings of this type. Of these fluid passages, a fluid inlet 9 is visible in the drawing, through which the fluid to be cleaned may be supplied to the cavity 10 in filter housing 1 that forms the dirty side during the filtration process. An outlet passage 13 is provided for the discharge of the cleaned fluid at the bottom part 5, coaxially to the longitudinal axis 11, which feeds at the lower end via a discharge strainer 15 into the tank. The upper end of the housing 1 may be closed via a cover 18 that may be screwed into the housing top 7.

Figure 2:
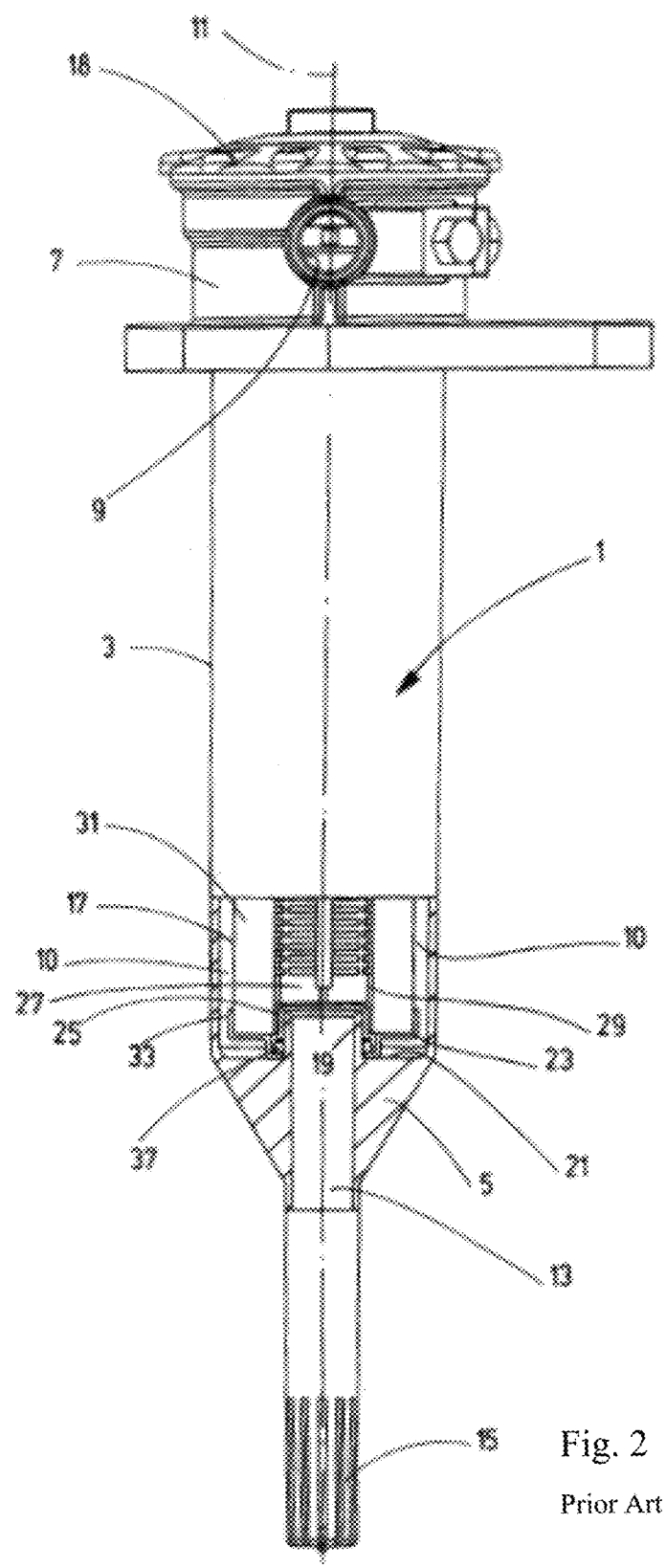
FIG. 2 is a front view of the filter device of FIG. 1 with a partial cross-section of the bottom part of the filter housing.
Figure 7:
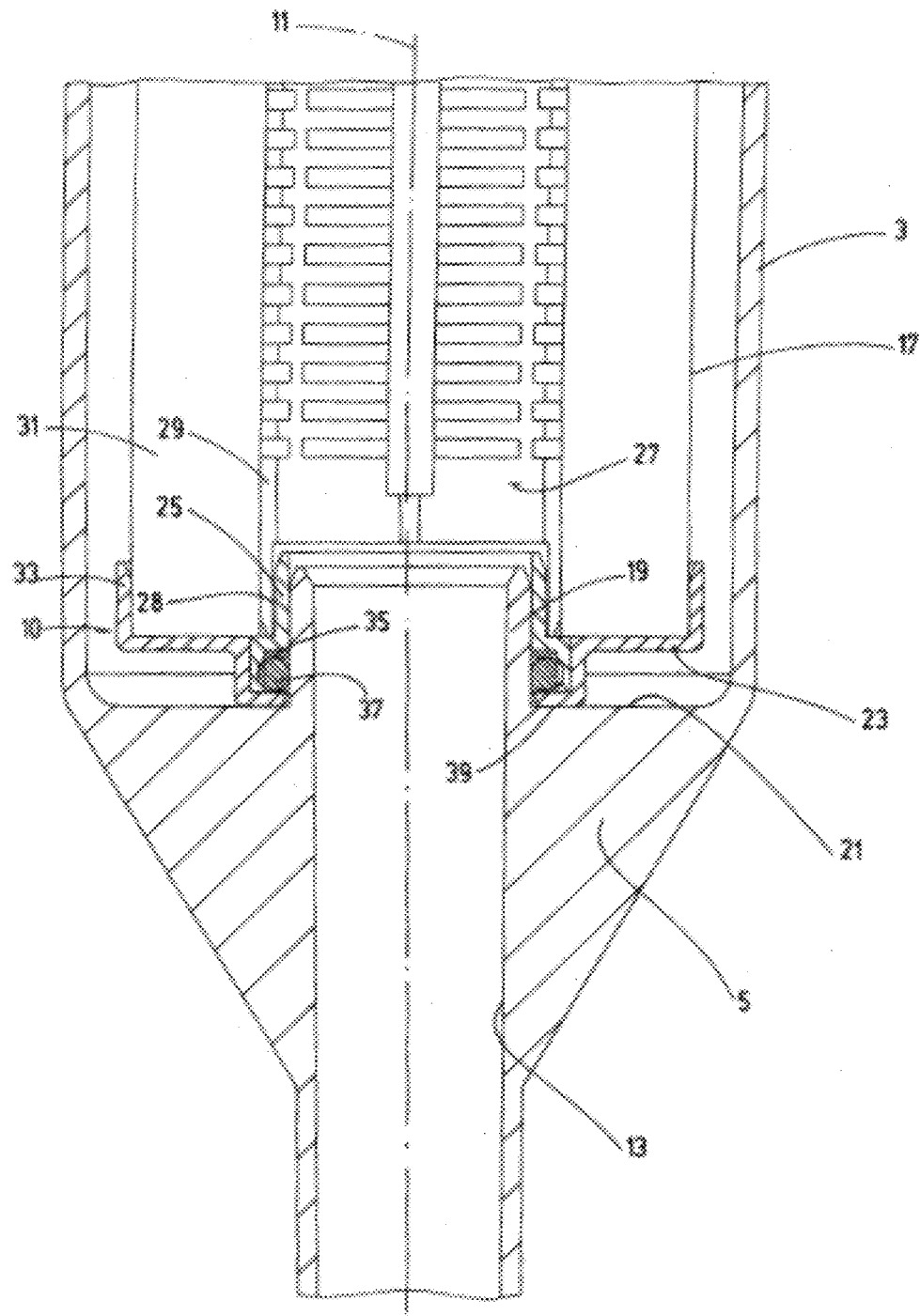
FIG. 7 is a partial front view in cross section of the part of the housing shown in FIG. 2 in a larger scale.

The filter device depicted in FIGS. 1 and 2 corresponds to the prior art. As is apparent from the cross section of the housing part in FIG. 2 and from the enlarged representation of FIG. 7, which depicts the partial cross section, the filter element 17 located inside filter housing 1 as well as the housing bottom 5 that forms the element seat correspond to a commonly used standard design. As shown most clearly in FIG. 7, the element seat formed on bottom 5 comprises a pipe socket 19 that forms the upper entry section of the outlet passage 13. The pipe socket 19 protrudes, coaxial to the longitudinal housing axis 11, from the flat bottom surface 21 of the bottom 5. The lower end cap 23 of the filter element 17, which faces bottom 5, comprises a connection adapter 25, which extends coaxial to the longitudinal housing axis 11, in order to form a connector, wherein said connection adapter 25 extends into the inner filter cavity 27 of the filter element 17 that forms the filtrate end in the filtration process. The filter cavity 27 is surrounded by a supporting tube 29, the lower end of which is in contact with the outer side 28 of the connection adapter 25. The filter material 31 that surrounds the supporting tube 29 is, in the usual manner, surrounded by the rim 33 of end cap 23, forming a surround. As is most apparent from FIG. 7, the connection adapter 25 is provided at the lower end with a seat 35 for a sealing ring in form of an O-ring 37. FIG. 7 depicts the filter element 17 in operating position, in which the connection adapter 25 is pushed onto the pipe socket 19 of the element seat, and where the O-ring 37 forms a seal between the dirty side and the filtrate side. The flat bottom surface 21 of bottom 5 forms the end stop with which the end cap 23 makes contact with the border 39 provided on the seal seat 35.

Figure 3:
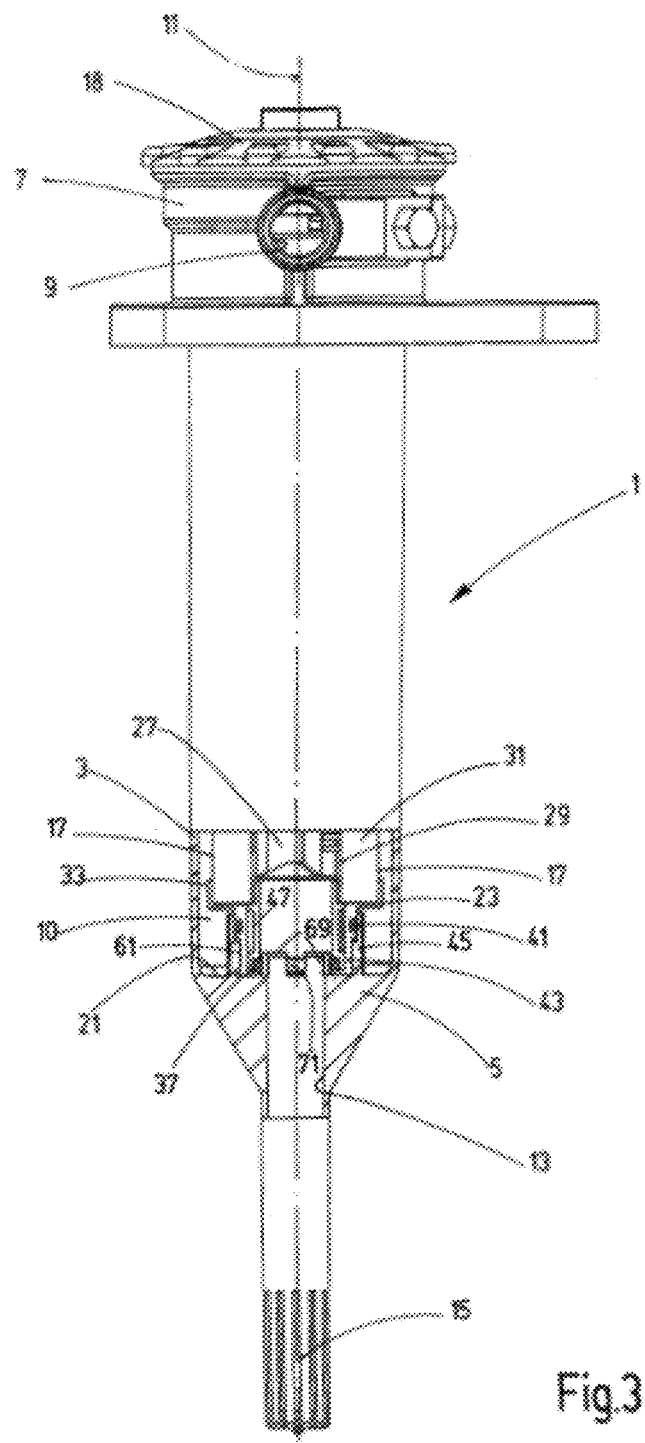
FIG. 3 is a front view of the filter device according to one exemplary embodiment of the invention, with a partial cross-section of the bottom part of the filter housing.

FIG. 3 depicts the filter housing 1 with the element seat formed on bottom 5 as well as the filter element 17, each in a further developed design according to the invention. The corresponding details are again more clearly apparent from the respective cross section of FIG. 8 in a larger scale. As shown, the end cap 23 is provided, in addition to the sealing ring 37, similar to that shown in FIGS. 2 and 7, and a second sealing ring 41, like the first sealing ring 37 of the standard filter element 17, forms in the filter element 17 according to the invention the seal between the dirty side (the cavity 10 that surrounds filter element 170 and the filtrate side (filter cavity 27). Both sealing rings 37, 41 are disposed at an axial and radial distance relative to each other and are retained in connection adapter 43.

Figure 8:
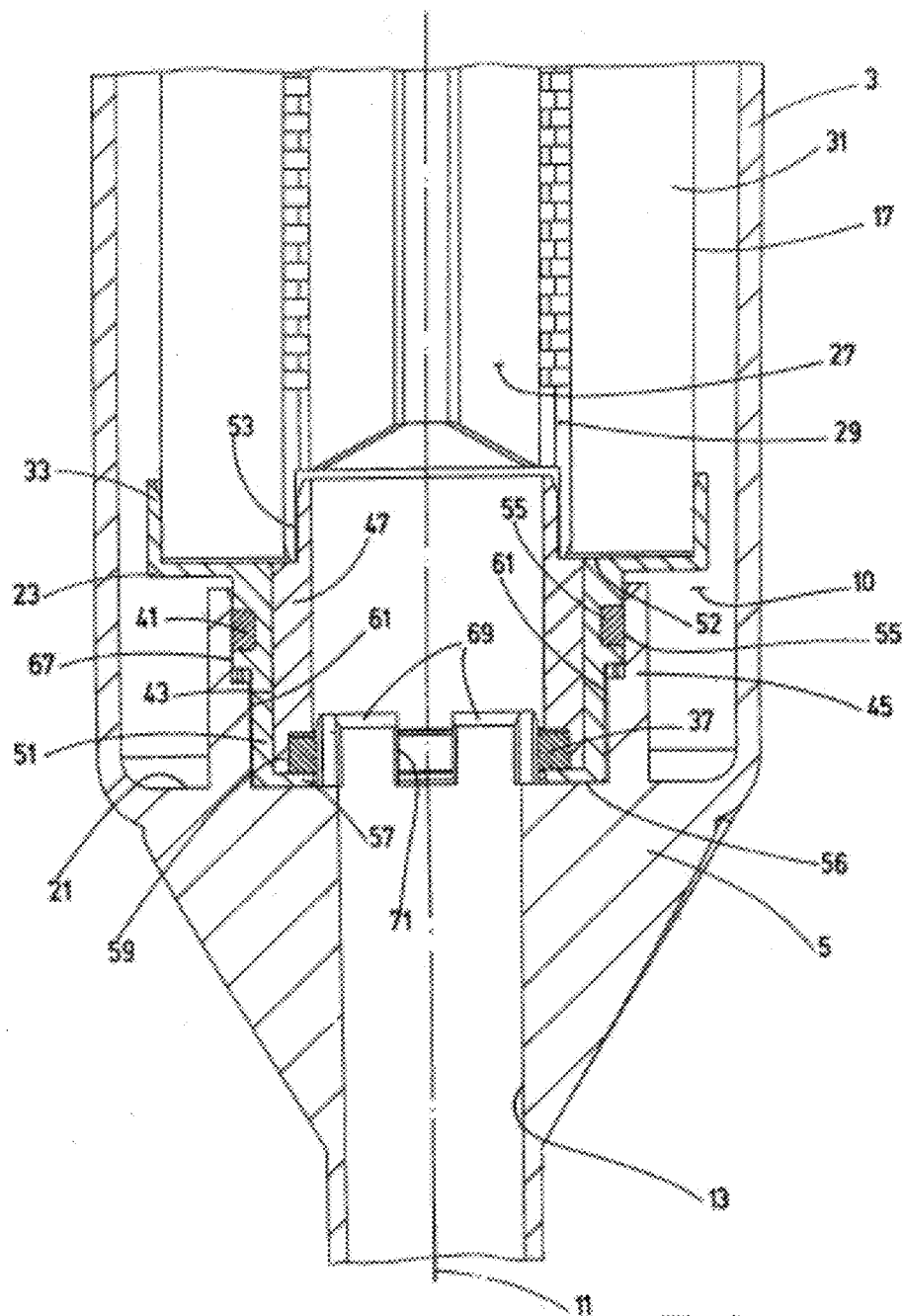
FIG. 8 is a partial front view in cross section of the part of the housing shown in FIG. 3 in a larger scale.
Figure 12:
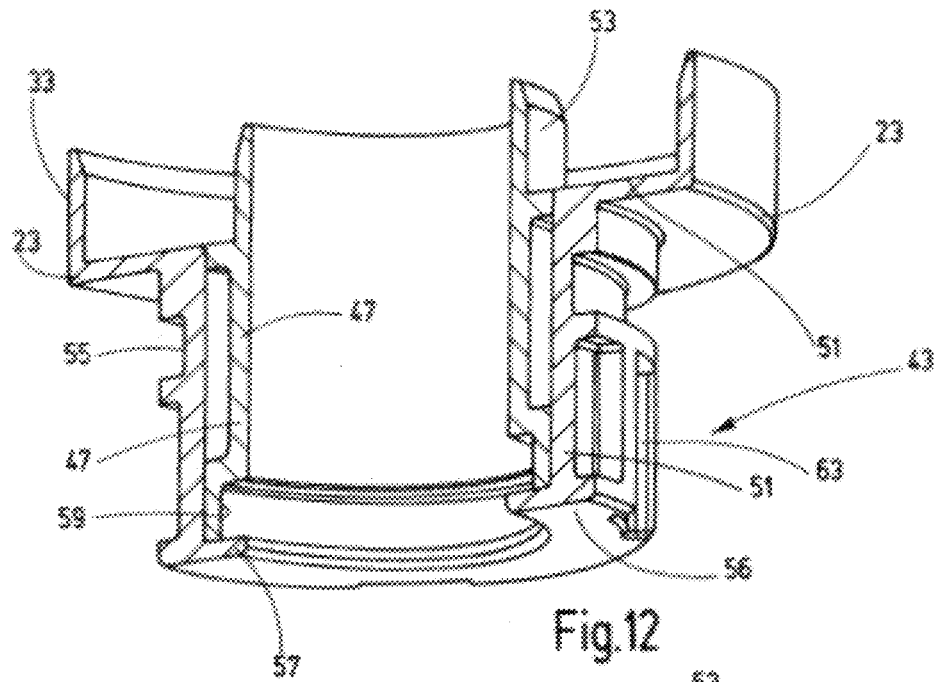
FIG. 12 is a perspective view of the end cap of FIG. 11 in vertical cross-section.
Figure 11:
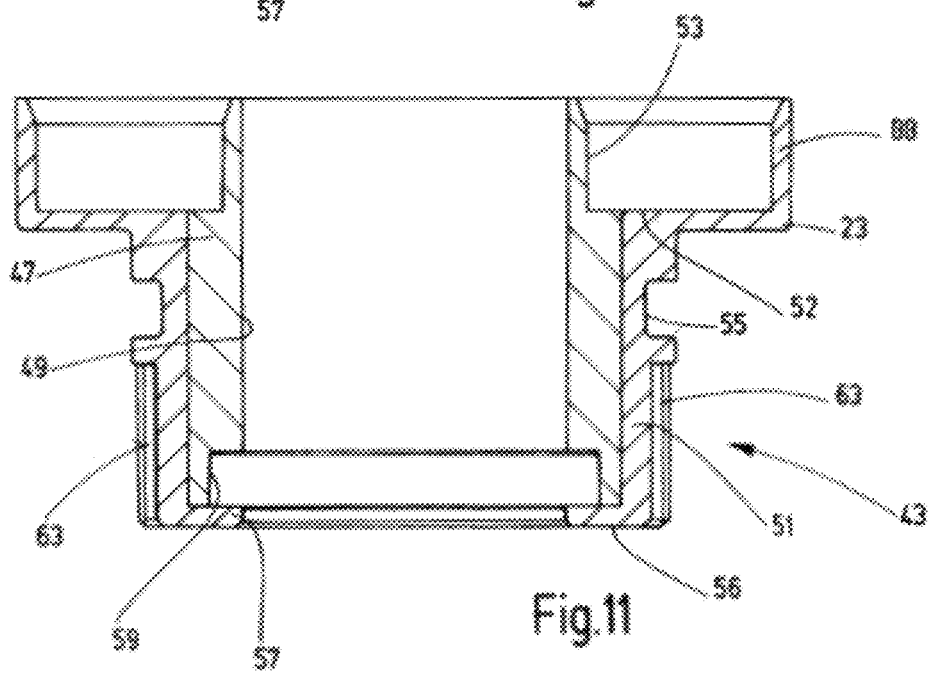
FIG. 11 is an enlarged front view in section of the separately shown lower end cap of the filter element of one embodiment of the filter device according to the invention.

In the filter element 17 according to the invention, the second sealing ring 41 is disposed on the outside of the connection adapter 43 that forms the connection adapter of the end cap 23 and forms, in the operating position shown in FIG. 8, the seal on the inside of the pipe socket 45 of the element seat. Just as the pipe socket 19 of the standard filter housing, the pipe socket 19 extends coaxially upwards with respect to the longitudinal axis 11 in the filter housing 1 according to the invention from the flat bottom surface 21 of the bottom 5. Further details of the element seat with pipe socket 45 can be seen in FIG. 6 as well as FIGS. 15 and 16. Details concerning the connection adapter of the filter element 17 according to the invention with connection adapter 43 are most clearly seen in FIGS. 11 and 12. As depicted, the connection adapter 43 is formed in two parts and comprises an inner sleeve body 47 concentric with respect to the longitudinal axis, which inner sleeve body is press moulded from plastic and forms the inner wall 49 of the connection adapter 43. The outside of connection adapter 43 is formed by a ring body 51, made from press-moulded plastic and surrounding the sleeve body 47 and in contact with it. The inner end 52 of the ring body 51 is connected to the part of the end cap 23 with the outer rim 33 that forms the surround for the filter material 31. The inner sleeve body 47 extends upwards beyond the upper end 52 of the ring body 51 and forms on the outside of the protruding part a contact surface 53 for the supporting tube 29. An annular groove 55 is formed at an axial distance from the upper end 52 for retaining the second sealing ring 41 on the outside of the ring body 51. At the lower end 56, located opposite the upper end 52, the ring body 51 is provided with a radially inward protruding border 57, which overlaps the lower end of the inner sleeve body 47. In the overlapping end section, the inner sleeve body 47 is provided with a recess 59 in form of a step, which is completed by the overlapping border 57 of the ring body 51 to form an annular groove, which forms the seat for the first sealing ring 37.

Figure 6:
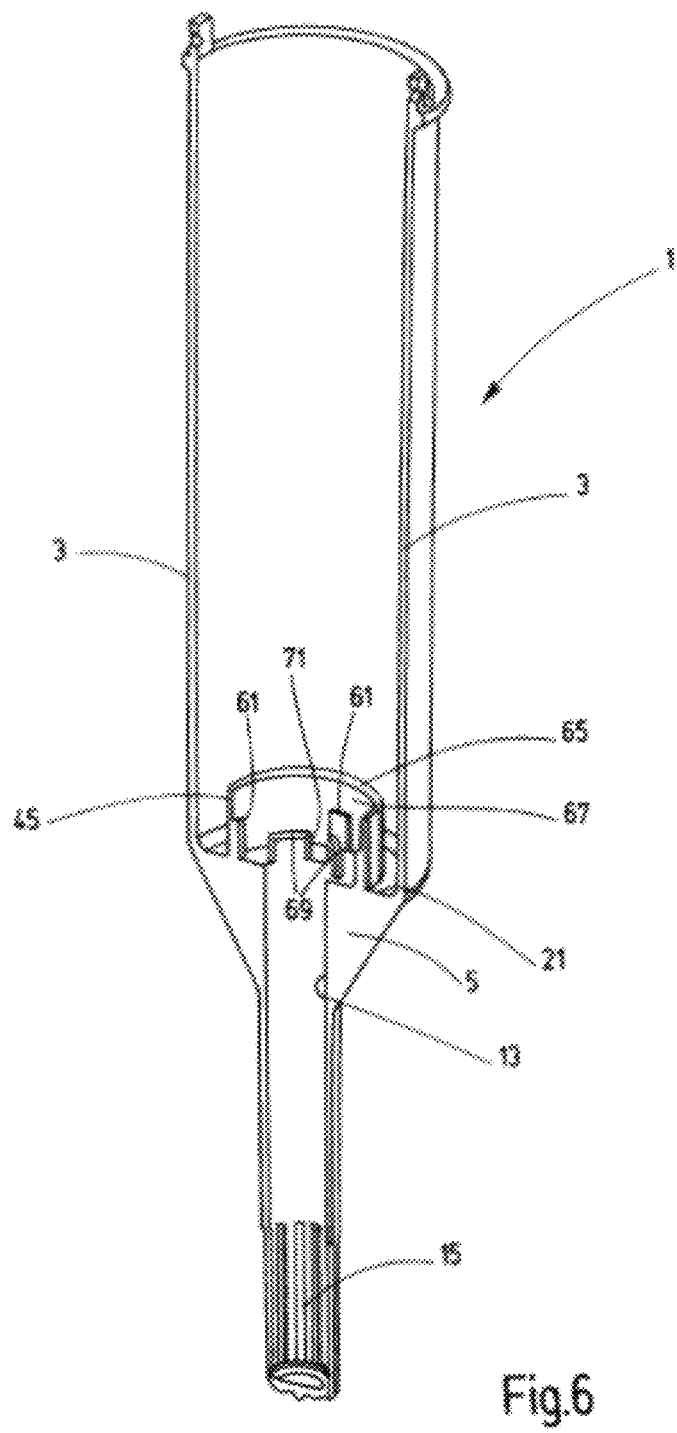
FIG. 6 is a perspective view in cross section of an empty filter housing according to the exemplary embodiment of FIGS. 3 and 5 of the invention.
Figure 14:
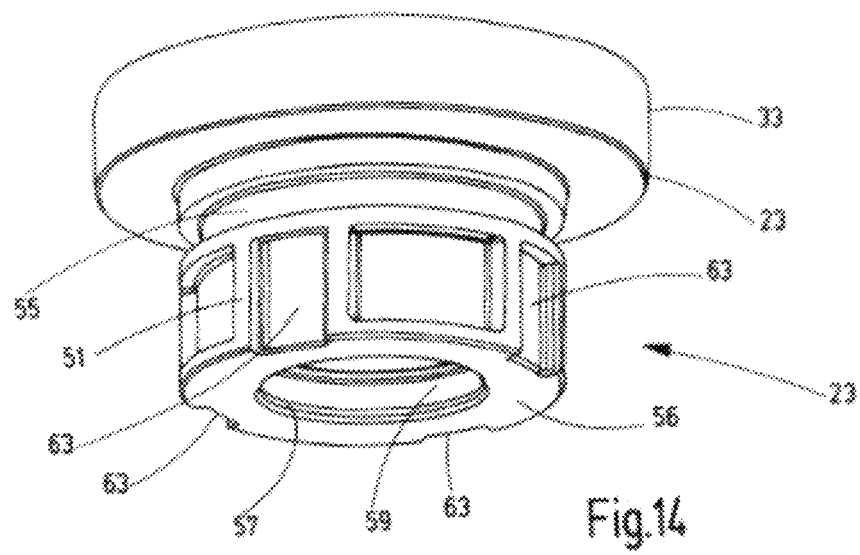
FIGS. 13 & 14 are perspective views of the end cap of FIGS. 11 and 12, viewed from top and bottom, respectively.
Figure 13:
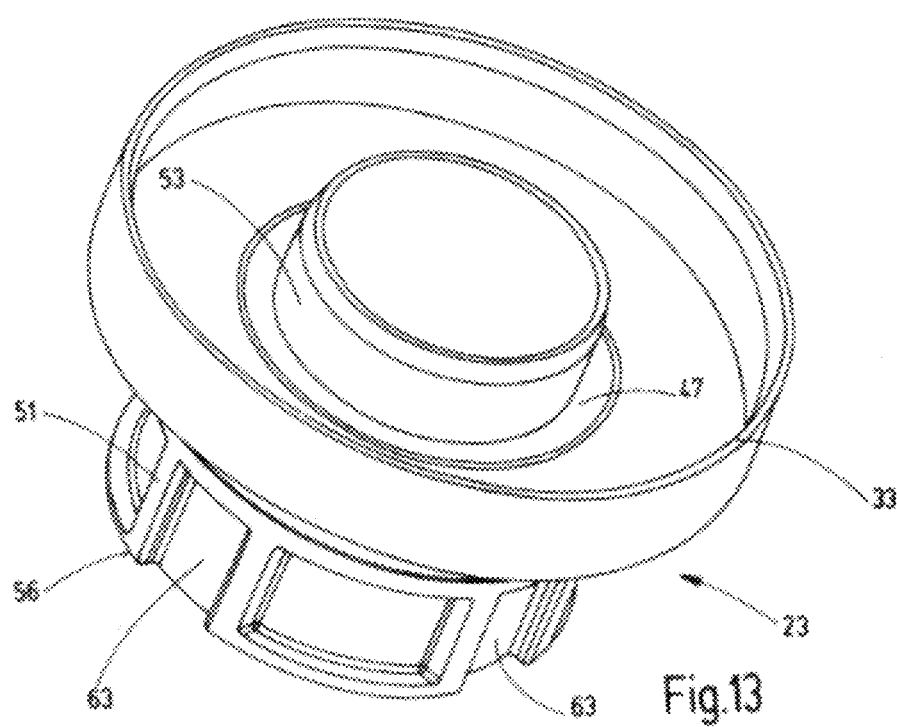
Figure 15:
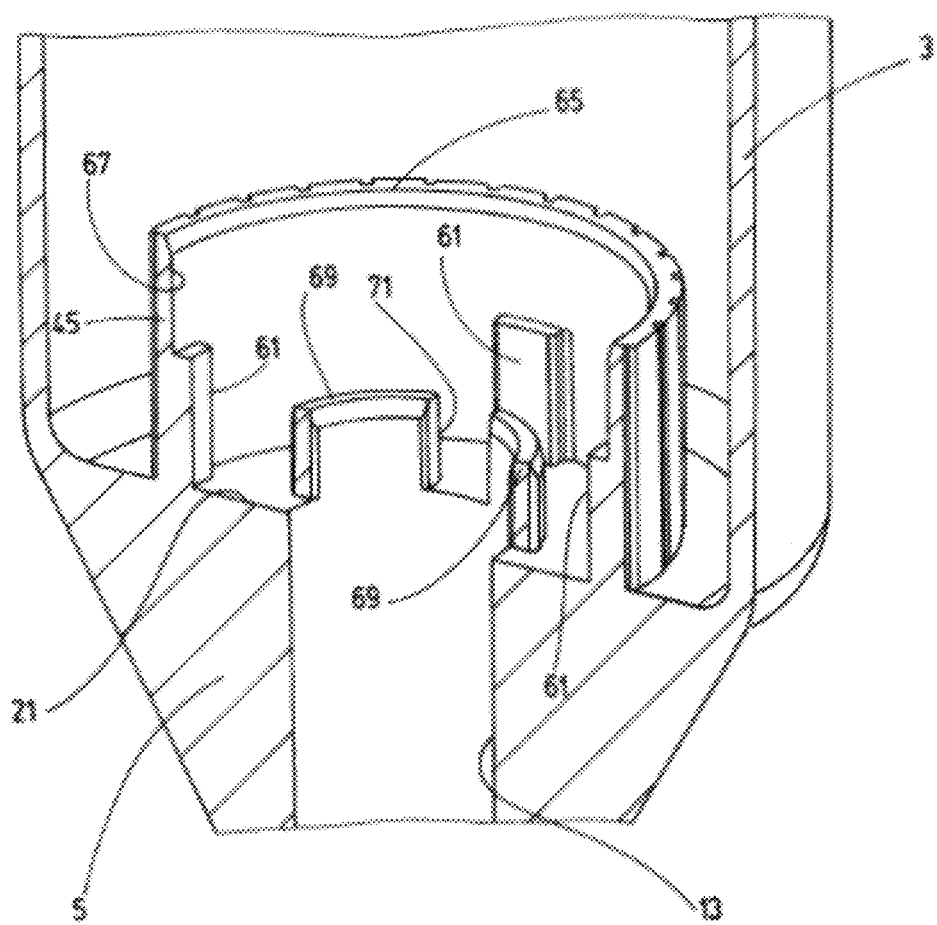
FIG. 15 is a perspective view in vertical section of the bottom part of the filter housing of FIG. 6 that forms the element seat.
Figure 16:
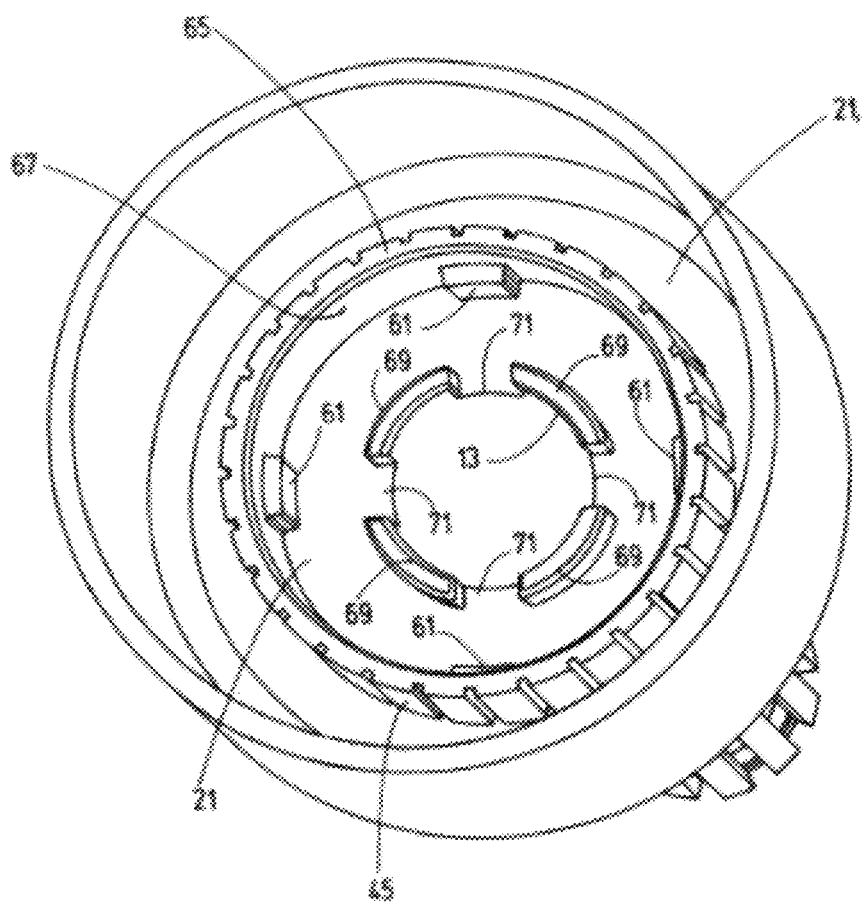
FIG. 16 is a perspective view of the bottom part of FIG. 15 depicting a top view of the element seat.

As indicated best in FIGS. 6, 15 and 16, which show the details of the element seat of the filter housing 1 according to the invention, the pipe socket 45 is provided on its inside, starting from the bottom surface 21, with a pattern of rib-shaped and radially inward protruding projections 61. Associated with those projections 61, a complementary pattern of recesses 63 is formed on the outside of the ring body 51 of end cap 23 of the filter element 17 according to the invention. As is most clearly shown in FIGS. 13 and 14, the recesses 63 are open at the lower end of ring body 51 so that, if the positional reference to the rib-shaped projections 61 fit, they are received in the recesses 63 in the operating position of the filter element 17. As is most clearly shown in FIGS. 6 and 15, the axial height of the projections 61 is chosen such that, between the upper end of projections 61 and the upper border 65 of the pipe socket 45, an inner wall surface 67 free of projections 61 is available as sealing surface for interaction with the second sealing ring 41 of the filter element 17 that is inserted in operating position.

As indicated best in FIGS. 15 and 16, at the outlet of the outlet passage 13, protruding from the bottom surface 21, a crown of pipe segments 69 is disposed that leaves gaps 71 between them. With a filter element 17 inserted in operating position, the first sealing element 37, which has no sealing function when inserted in operating position into a filter housing 1 according to the invention, is locked in position through making contact with the outside of the pipe segments 69 (see FIG. 8). The gaps 71 provide for the free flow of fluid.

Figure 4:
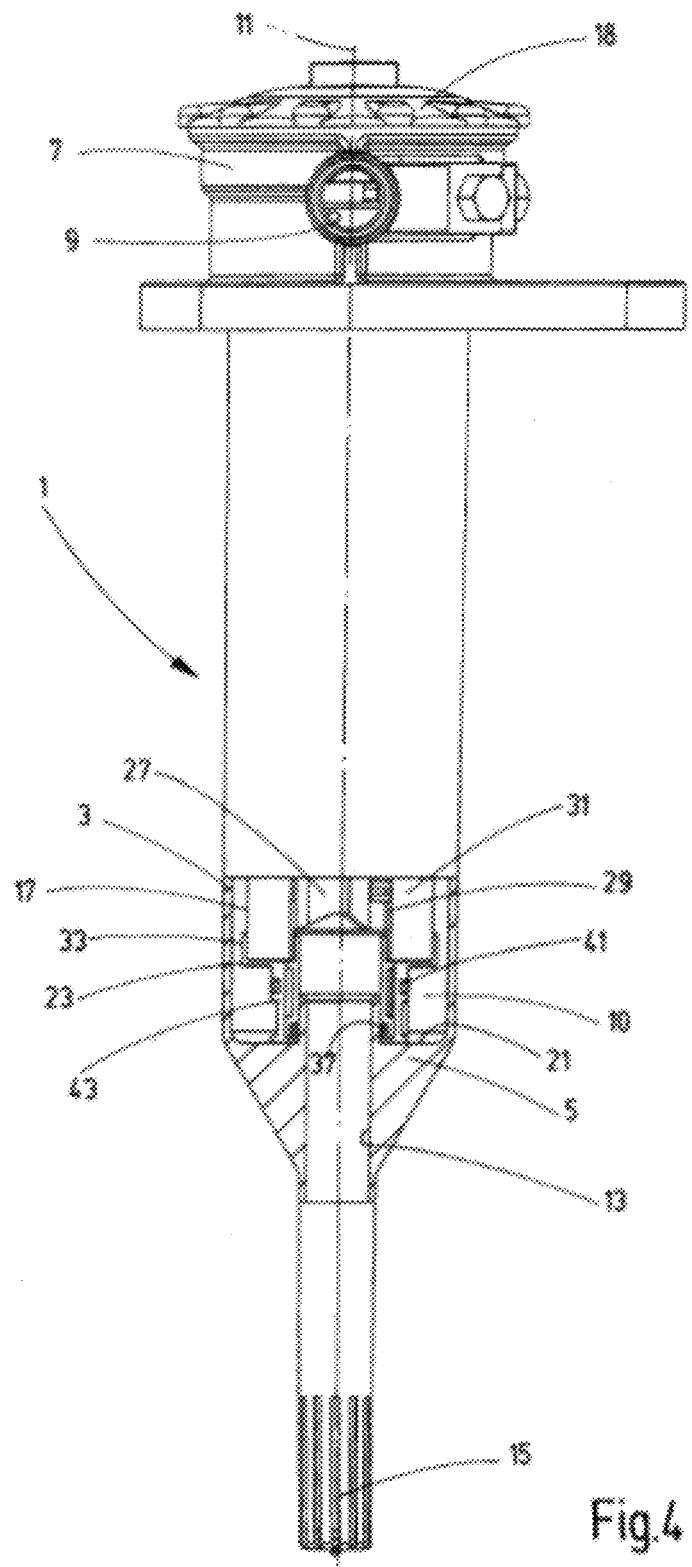
FIG. 4 is a front view in partial cross-section of the front view of a filter device comprising a filter element according to the invention and a prior art standard filter housing.
Figure 9:
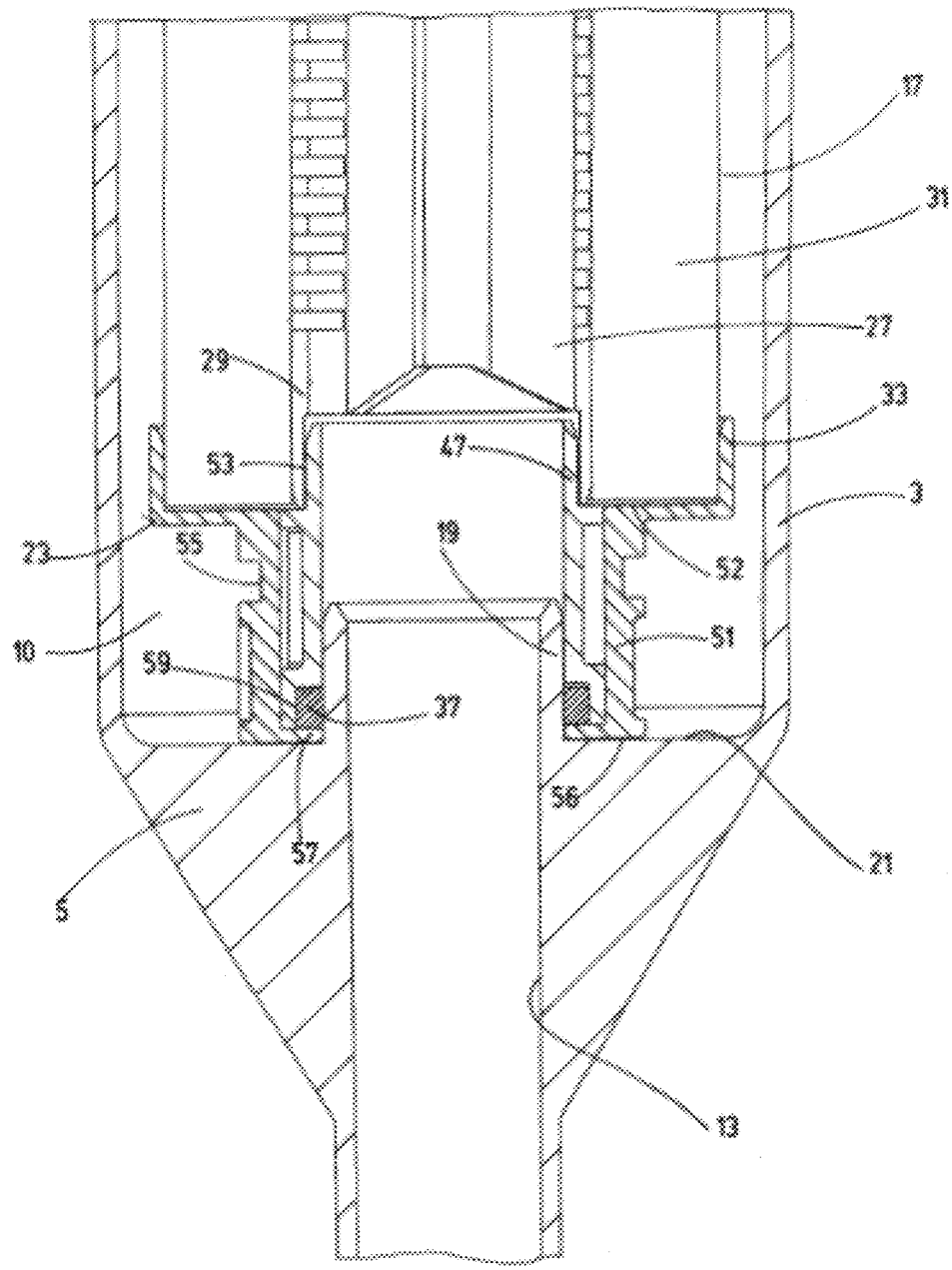
FIG. 9 is a partial front view in cross section of the part of the housing shown in FIG. 4 in a larger scale.

The arrangement that is depicted in FIG. 4, and clearer in FIG. 9, shows a filter element 17 according to the invention inserted in operating position into a standard filter housing 1. As shown, the connection adapter 43 of end cap 23 overlaps with its inner sleeve body 47 the pipe socket 19 of the element seat of the standard filter housing 1. The first sealing ring 37 provides the seal on the outside of pipe socket 19. As in the arrangement shown in FIGS. 7 and 8, the flat bottom surface 21 of the bottom 5 forms in operating position the end stop surface for the lower border 57 of the connection adapter 43. Thus, the sealing and positioning takes place in the same manner as when inserting a standard filter element 17 into a standard housing, as it is shown in FIG. 7.

Figure 5:
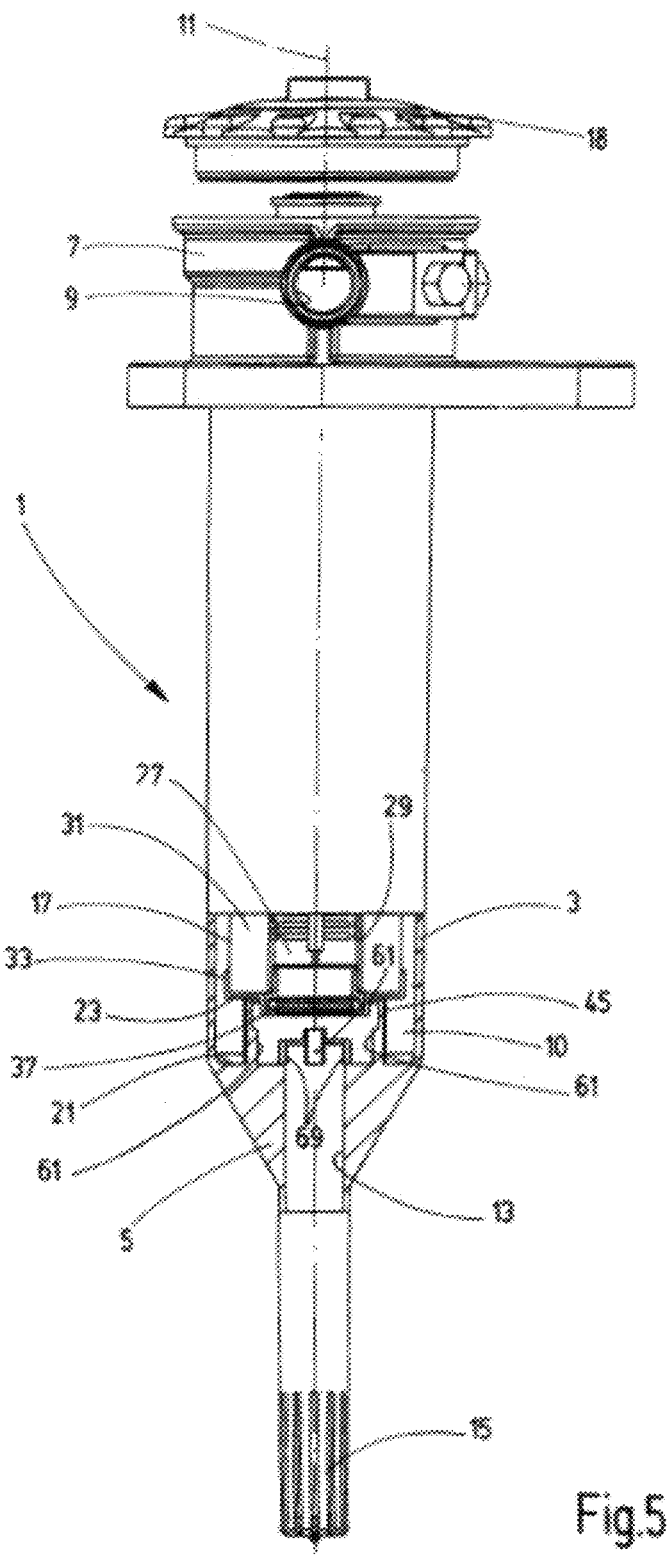
FIG. 5 is a front view in partial cross-section a filter device comprising a filter housing according to the invention and a partially inserted, incorrectly placed, prior art standard filter element.
Figure 10:
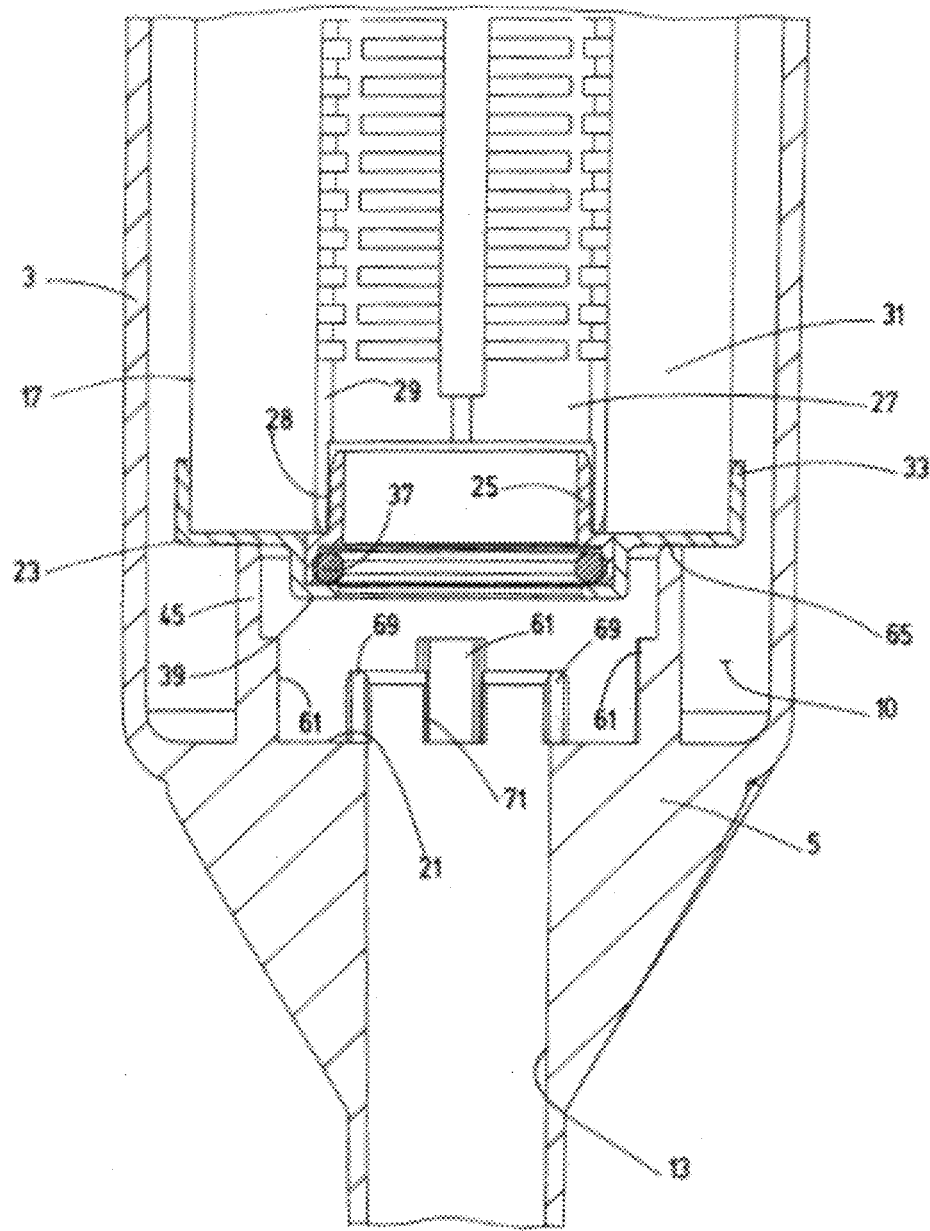
FIG. 10 is a partial front view in cross section of the part of the housing shown in FIG. 5 in a larger scale.

The arrangement that is depicted in FIG. 5, and clearest in FIG. 10, shows an attempt to insert a standard filter element 17 into the element seat with a pipe socket 45 of a filter housing 1 according to the invention. Due to the fact that the underside of end cap 23 makes contact with the upper border 65 of the pipe socket 45 of the element seat, a gap remains between the lower border 39 of end cap 23 and the bottom surface 21 that forms the end stop surface for positioning. Moreover, the first sealing ring 37 is not in contact with any sealing surface, so that also in this respect no functionality is provided. As depicted in FIG. 5, which shows this situation, the incorrect placement of the filter element 17 has the effect that the housing cover 18 cannot be closed, which unambiguously indicates an error to the user.

Despite the fact that the design of the filter element 17 differs relative to that of the prior art, in addition to the new design of the filter housing 1, which forms the element seat on its bottom 5, the invention permits the already existing standard filter housings present in the field to fit with standard filter elements and with the filter elements 17 according to the invention and to operate with them safely. Moreover, the invention provides significant advantages when using the filter housing 1 according to the invention. For one, the danger is averted that a standard filter element is fitted erroneously because the installation in operating position is only possible if, with a kind of "tongue and groove" system, the correct pattern arrangement of design irregularities is present on the element seat 45 and on the filter element end cap 23. This configuration ensures that operation is only possible with a filter element 17 with special characteristics such as filter fineness, pressure rating and such like. Furthermore, due to the reciprocally interlocking engagement of the design irregularities, as in this instance the projections 61 and the recesses 63, an anti-twist device is provided for the filter element 17 against torque moments in the instance of tangential flow.

While one embodiments has been chosen to illustrate the invention, it will be understood by those skilled in the art that various changes and modifications can be made therein without departing from the scope of the invention as defined in the claims.

The invention claimed is:
1. A filter device, comprising:
a filter housing having an element seat therein with a pipe socket;
a filter element exchangeably disposed in said filter housing and having filter material and an end cap on one end of said filter material, said end cap having a cap rim surrounding said filter material; and a connection adapter on said end cap attaching said filter element in an operating position to said element seat in said filter housing, forming a fluid impermeable connection between said filter element and said filter housing and enabling a rotationally and positionally fixed mounting of said filter element and a formation of the fluid-impermeable connection with element seats of different designs in said filter housing, said connection adapter having an outer ring body with a pattern of ring design irregularities deviating from a circular cylinder on an outside surface of said outer ring body, said ring design irregularities on said outer ring body being matched to and engageable with a complementary pattern of seat design irregularities deviating from a circular cylinder on an inside surface of said pipe socket of said element seat of one of the different designs of said element seats in said filter housing, alignment of said ring and seat design irregularities placing said filter element in the operating position in said filter housing.

2. A filter device according to claim 1 wherein
said connection adapter extends coaxially along a longitudinal axis of said filter element;
a first sealing ring on an inside surface of said connection adapter forms a seal between an outside surface of said pipe socket and said inside surface of said connection adapter in a first design of said seat element in the operating position; and
a second sealing ring on an outside surface of said connection adapter forms a seal between said inside surface of said pipe socket and said outside surface of said connection adapter in a second design of said element seat in the operating position of said seat element.

3. A filter device according to claim 2 wherein
said connection adapter comprises an inner sleeve body extending concentrically relative to a longitudinal axis of said filter element and forming an inner wall of said connection adapter, said outer ring body surrounding said inner sleeve body, an end of said outer ring body joining said cap rim, said outer ring body forming an outside of said connection adapter.

4. A filter device according to claim 3 wherein
a recess is in an outer end section of inner sleeve body and receives said first sealing ring; and
an inner end of said inner sleeve body protrudes into a filter space inside of said filter element and forms a contact surface engaging a contact surface of a supporting tube of said filter element.

5. A filter device according to claim 1 wherein
said ring design irregularities comprise recesses open in an insertion direction of said filter element into said filter housing; and
said seat design irregularities comprise rib-shaped protrusions extending radially inwardly from a wall of said pipe socket of the second design.

6. A filter device according to claim 1 wherein
said pipe socket comprises an entry section facing said filter element and having a sealing surface free of protrusions on an inner wall of said pipe socket providing a contact surface for a sealing ring on said end cap.

7. A filter device according to claim 3 wherein
said outer ring body comprises an end rim remote from said filter material, said end rim overlapping an adjacent end of said inner sleeve body forming a seal recess at said adjacent end of said inner sleeve body, said seal recess receiving and retaining said first sealing ring and forming an annular groove between said end rim and said adjacent end of said inner sleeve body.

8. A filter device according to claim 7 wherein
said ring design irregularities comprise recesses open in an insertion direction of said filter element into said filter housing;
said seat design irregularities comprise rib-shaped protrusions extending radially inwardly from a wall of said pipe socket of the second design; and
said recess on said outer ring body extends from said end rim into a vicinity of an annular groove retaining said second sealing ring, said annular groove being in a vicinity of a part of said outer ring body at said cap rim.

9. A filter device according to claim 1 wherein
said ring design irregularities comprise ring recesses in an outer surface of said outer ring body, said ring recesses extending parallel and radially to a longitudinal axis of said filter element and being open on an axial end remote from said filter element; and
said seat design irregularities comprise seat projections on said inside surface of said pipe socket, said seat projections extending parallel and radially relative to said longitudinal axis.

10. A filter device according to claim 2 wherein
said first and second sealing rings are axially spaced form one another on said connection adapter along said longitudinal axis.

11. A filter element, comprising:
a filter material surrounding a filter cavity and extending axially along a longitudinal axis between axial ends of said filter material;
an end cap on one end of said filter material, said end cap having a cap rim surrounding said filter material; and
a connection adapter on said end cap attachable to element seats of different designs in filter housings for forming a fluid impermeable connection with the filter housing and for rotationally and positionally mounting of said filter material in the filter housing in an operating position in the filter housing, said connection adapter having an outer ring body with a pattern of ring design irregularities deviating from a circular cylinder on an outside surface of said outer ring body, said ring design irregularities on said outer ring body being matchabe to and engageable with a complementary pattern of seat design irregularities deviating from a circular cylinder on an inside surface of a pipe socket of the element seat of one of the different designs by alignment of the ring and seat design irregularities.

12. A filter element according to claim 11 wherein
said connection adapter extends from said end cap coaxially along said longitudinal axis;
a first sealing ring is on an inside surface of said connection adapter capable of forming a seal between an outside surface of the pipe socket and said inside surface of said connection adapter in a first design of the seat element in the operating position; and
a second sealing ring is on an outside surface of said connection adapter capable of forming a seal between the inside surface of the pipe socket and said outside surface of said connection adapter in a second design of the element seat in the operating position.

13. A filter element according to claim 11 wherein
said ring design irregularities comprise ring recesses in an outer surface of said outer ring body, said ring recesses extending parallel and radially to said longitudinal axis and being open on an axial end remote from said filter material.

14. A filter device according to claim 12 wherein said first and second sealing rings are axially spaced form one another on said connection adapter along said longitudinal axis.

* * * * *